（12）United States Patent
Schmogrow et al.

(10) Patent No.: US 12,250,501 B2
(45) Date of Patent: Mar. 11, 2025

(54) NETWORK ARCHITECTURE WITH VARIABLE GRANULARITY OPTICAL ROUTING

(71) Applicant: Google LLC, Mountain View, CA (US)

(72) Inventors: Rene Marcel Schmogrow, Santa Clara, CA (US); Mattia Cantono, Santa Clara, CA (US); Massimiliano Salsi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 347 days.

(21) Appl. No.: 17/494,963

(22) Filed: Oct. 6, 2021

(65) Prior Publication Data

US 2023/0108236 A1   Apr. 6, 2023

(51) Int. Cl.
*H04Q 11/00* (2006.01)
*H04J 14/02* (2006.01)

(52) U.S. Cl.
CPC .... *H04Q 11/0005* (2013.01); *H04J 14/02122* (2023.08); *H04Q 11/0071* (2013.01); *H04Q 2011/0032* (2013.01)

(58) Field of Classification Search
CPC ........... H04Q 11/0005; H04Q 11/0071; H04Q 2011/0032; H04J 14/0213; H04J 14/0217; H04J 14/0212
USPC .................................. 398/9, 43; 385/16, 24
See application file for complete search history.

(56) References Cited

U.S. PATENT DOCUMENTS

| | | | |
|---|---|---|---|
| 6,792,208 B1 | 9/2004 | Mukherjee et al. | |
| 6,882,800 B1 | 4/2005 | Graves | |
| 8,737,776 B2 | 5/2014 | Boduch | |
| 10,542,334 B2 | 1/2020 | Komiya | |
| 2003/0039003 A1 | 2/2003 | Jakobik et al. | |
| 2003/0118275 A1 | 6/2003 | Kim et al. | |
| 2003/0185565 A1 | 10/2003 | Wang et al. | |
| 2005/0281504 A1 | 12/2005 | Wang et al. | |

(Continued)

FOREIGN PATENT DOCUMENTS

| | | |
|---|---|---|
| CN | 1901416 A | 1/2007 |
| CN | 101924961 A | 12/2010 |

(Continued)

OTHER PUBLICATIONS

Yamada et al. Optical Node Architectures That Utilize Dedicated Add/Diop Switches to Realize Colorless Directionless and Contentionless Capability. IEICE Transaction on Communication, Communications Society, Tokyo, JP, vol. E95B, No. 4, Apr. 1, 2012 (Apr. 1, 2012), pp. 1307-1316.

(Continued)

*Primary Examiner* — Jerry M Blevins
(74) *Attorney, Agent, or Firm* — Lerner David LLP (57) ABSTRACT

An optical transport network (OTN) node including a plurality of optical circuit switches (OCSs), each OCS being a respective degree of the OTN node, at least two of the OCSs including an input port configured to be connected to a respective optical transport fiber outside of the OTN node, at least one first output port connected to a first switching layer, and at least one second output port connected to a second switching layer. The first and second switching layers have different levels of granularity, such as but not limited to a wavelength switched layer, a band switched layer or a fiber switched layer.

18 Claims, 8 Drawing Sheets

(56) References Cited

U.S. PATENT DOCUMENTS

| | | | |
|---|---|---|---|
| 2013/0195452 A1* | 8/2013 | Hui | H04J 14/0298 |
| | | | 398/50 |
| 2013/0236181 A1 | 9/2013 | Coroy | |
| 2016/0156546 A1* | 6/2016 | Ceccarelli | H04Q 11/0066 |
| | | | 398/52 |
| 2017/0012856 A1* | 1/2017 | Zhao | G06F 30/18 |
| 2017/0104525 A1* | 4/2017 | Prakash | H04B 10/0791 |

FOREIGN PATENT DOCUMENTS

| | | |
|---|---|---|
| EP | 3051719 A1 | 8/2016 |
| JP | 2008503920 A | 2/2008 |
| JP | 2012039659 A | 2/2012 |
| WO | 2012113844 A1 | 8/2012 |
| WO | 2015135296 A1 | 9/2015 |

OTHER PUBLICATIONS

International Search Report and Written Opinion for International Application No. PCT/US2022/045609 dated Jan. 27, 2023. 17 pages.

Office Action for Japanese Patent Application No. 2023-572880 dated Nov. 26, 2024. 5 pages.

* cited by examiner

NETWORK ARCHITECTURE WITH VARIABLE GRANULARITY OPTICAL ROUTING

BACKGROUND

Optical transport networks (OTN) provide a widely adopted framework for routing optical signals over a network of optical fibers using a combination of transport, multiplexing, and switching elements. Current systems support wavelength switched architectures that control optical path routing at the wavelength level. For example, both colorless/directionless (CD) and colorless/directionless/contentionless (CDC) systems rely heavily on wavelength selective switches (WSS) that can be programmed to route optical signals through a node based on the signals' respective frequencies or wavelengths.

Increases in the volume of traffic carried over optical transport networks is already outpacing the advancements in optical fiber capacity, and is expected to accelerate even further. Therefore, in order to meet the increasing demand, more and more optical fiber will inevitably be lighted up. As the amount of fiber paths deployed increases substantially relative to increases in capacity of each path, wavelength switched architectures will likely be replaced by fiber switched architectures to ensure cost efficiency and scalability.

However, the current wavelength switched architectures present several challenges to transitioning from a wavelength switched architecture to a fiber switched architecture. Firstly, WSS modules of the wavelength switched architecture have a limited port count. Typically, a maximum of 16 transport fibers can be connected to a single WSS, and the industry is currently focused on improving cost efficiency of WSS by means of repackaging and multi-degree integration. Secondly, for CD and CDC systems, the optical losses experienced at a module used to add and drop optical signals, such as a reconfigurable optical add/drop multiplexer (ROADM) node using multicast switch (MCS) modules for adding/dropping signals, scales with the number of degrees present at the node. There is a limit to the number of degrees that can be included in a point, at which point the optical losses become prohibitive and require additional amplification to avoid performance degradation. Thirdly, WSS modules are one of the costliest parts of a ROADM node.

BRIEF SUMMARY

The present disclosure provides an alternative switching architecture that flexibly can support both wavelength switched and fiber switched domains, as well as switching elements at other levels of granularity.

One aspect of the present disclosure is directed to an optical transport network (OTN) node including: a plurality of optical circuit switches (OCSs), wherein each OCS is a respective degree of the OTN node, at least two OCSs comprising an input port configured to be connected to a respective optical transport fiber outside of the OTN node, at least a first output port connected to a first switching layer having a first level of granularity, and at least a second output port connected to a second switching layer having a second level of granularity different from the first level of granularity.

In some examples, the first switching layer may be one of a wavelength switched layer, a band switched layer or a fiber switched layer, and the second switching layer may be a different one of the wavelength switched layer, the band switched layer or the fiber switched layer.

In some examples, the OTN node may further include a plurality of bi-directional node line amplifiers coupled to the input ports of the plurality of OCSs in a one-to-one correspondence, each bi-directional node line amplifier positioned between a respective input port and its corresponding optical transport fiber. In some examples, each bi-directional node line amplifier may include a band splitter configured to split an optical signal received from the respective optical transport fiber into different frequency bands, a plurality of ingress amplifiers, each ingress amplifier coupled to a respective output port of the band splitter, a band combiner configured to combine optical signals of the different frequency bands received from respective OCSs of the OTN node, and a plurality of egress amplifiers, each egress amplifier coupled to a respective input port of the band combiner. In some examples, the band splitter may be a C+L band splitter. In some examples, the band combiner may be a C+L band combiner.

In some examples, the first switching layer may be a fiber switched layer, and the second switching layer may be a wavelength switched layer.

In some examples, at least two OCSs further include at least a third output port connected to a third switching layer having a third level of granularity different from the first and second levels of granularity.

In some examples, the first switching layer may be a fiber switched layer, and the second switching layer may be a band switched layer. The band switched layer may include a plurality of band splitters, and respective output ports of the plurality of band splitters may be connected to input ports of a second plurality of OCSs in a one-to-one correspondence, and at least one output port of each OCS of the second plurality of OCSs may be connected to a wavelength switched layer. In some examples, the fiber switched layer, the band switched layer, and the wavelength switched layer may be arranged in parallel. For instance, the fiber switched layer, the band switched layer, and the wavelength switched layer may be arranged in either a nested formation or a cascaded formation.

In some examples, each OCS may include a respective input port configured to be connected to a respective optical transport fiber outside of the OTN node, at least one respective first output port connected to the first switching layer, and at least one respective second output port connected to the second switching layer.

In some examples, the OTN node may further include the first switched layer and the second switched layer.

Another aspect of the disclosure is directed to a method including: connecting a plurality of degrees of a colorless/directionless (CD) node or a colorless/directionless/contentionless (CDC) node to a plurality of optical circuit switches (OCSs) in a one-to-one correspondence; connecting a fiber switched layer to the plurality of OCSs; and controlling the plurality of OCSs to divert routing of at least some received optical signals from the CDC node to the fiber switched layer.

Yet another aspect of the disclosure is directed to an OTN node including: a plurality of OCSs. Each OCS may be a respective degree of the OTN node, and at least one OCS may include: an input port configured to be connected to a respective optical transport fiber outside of the OTN node; at least a first output port connected to a first switching layer; at least a second output port connected to a second switching layer; and at least a third output port connected to a different one of the plurality of OCSs.

In some examples, each of the first switching layer and the second switching layer may be a respective wavelength switched layer including a plurality of wavelength selective switches (WSSs), and the third output ports of the plurality of OCSs may be connected to one another such that an optical signal transmitted between two of the third output ports does not pass through a WSS of the plurality of WSSs.

In some examples, each of the first switching layer and the second switching layer may be a respective wavelength switched layer, and the OTN node may have a total number of degrees greater than the number of degrees of the first switching layer and greater than the number of degrees of the second switching layer.

In some examples, the OTN node may further include a plurality of band splitters, each band splitter being connected between a corresponding input port and its respective optical transport fiber. The OTN node may be configured to route an entire optical band from one degree of the OTN node to another degree of the OTN node without passing through the wavelength switched layer.

In some examples, the first switching layer and the second switching layer may have different levels of granularity, and at least one of the switching layers may be one of a wavelength switched layer, a band switched layer, or a fiber switched layer.

In some examples, the OTN node may further include the first switching layer and the second switching layer.

In some examples, the OTN node may further a third switching layer, and each of the first switching layer, the second switching layer and the third switching layer may have different levels of granularity.

DETAILED DESCRIPTION

Overview

Each degree of the switching node architecture can be connected to any number of degrees through a series of interconnected optical circuit switches (OCS), or stated another way, 1×N optical switches. The OCSs determine the route that an optical signal received at the switch takes through the node. For instance, each OCS may include a plurality of output ports, at least one output port connecting to a first switching layer having a first granularity, and at least one other output port connecting to a second switching layer having a second granularity.

For example, the first switching layer may be a wavelength switched architecture, and the second switching layer may be a fiber switched architecture. Such an arrangement would allow for additional optical fiber to be deployed in the fiber switched architecture while the OCSs are set to relay optical signals to the wavelength switched architecture. Then, at a later time when it is desired to transition from wavelength switching to fiber switching, the transition may be as simple as switching the setting on the OCSs to relay some or all of the optical signals towards the fiber switched architecture.

In some arrangements, at least some of the output ports of the OCS s may be directly connected to ports of another OCS. In this manner, some or all of the degrees of the node can be connected to one another and route optical signals between one another without having to route the optical signals through a WSS. This may also be beneficial for nodes that include signal filtering or splitting components that do not require wavelength switching. For instance, for C+L band systems, each degree of the node may include a C/L band splitter configured to split incoming optical signals between the C and L optical bands. The OCSs of the node can then switch an entire optical band that enters at one degree to exit at a different degree without the optical signal passing through a WSS.

In some arrangements, a switching layer of a certain granularity can include multiple switched domains in parallel to one another. In one such example arrangement, a node may include multiple wavelength switched domains. The number of degrees connected to each parallel wavelength switched domain may be fewer than the number of optical fibers connecting to the overall node, but the individual parallel wavelength switched domains may be interconnected through the series of interconnected OCSs, through another switching layer of a different granularity, or both. Such an arrangement is potentially more cost efficient, since it avoids the need to increase the number of ports of the WSS modules of the wavelength switched layer.

In further arrangements, layers of different levels of granularity may be cascaded with or nested within one another. This may permit switching layers of the switching node to share at least some components with one another. For instance, in a node that includes both a band switched layer and a wavelength switched layer, the wavelength switched layer may be nested within the band switched layer. In such an arrangement, a conventional CD or CDC node may be connected between OCSs of the band switched layer, such that all optical signals are routed between degrees of the band switched layer, while a subset of those optical signals are further routed through the conventional CD or CDC node for the purpose of wavelength switching the subset of optical signals.

The arrangements described herein enable efficient node scaling by combining different switching technologies, such as wavelength switching, band switching and fiber switching, with one another. Furthermore, the arrangements can be made bi-directional, and are easily incorporable with existing switching architectures. The arrangements provide a simple path for evolving network architecture as switching requirements and demands change over time, such as transitioning from a predominantly wavelength switched architecture to a predominantly fiber switched architecture. Additionally, the arrangements described herein avoid the costs and optical losses associated with adding WSS modules, adding ports to WSS modules, or both, which would otherwise be necessary to expand the routing functionality of a conventional CD or CDC node.

Example Systems

Figure 1A:
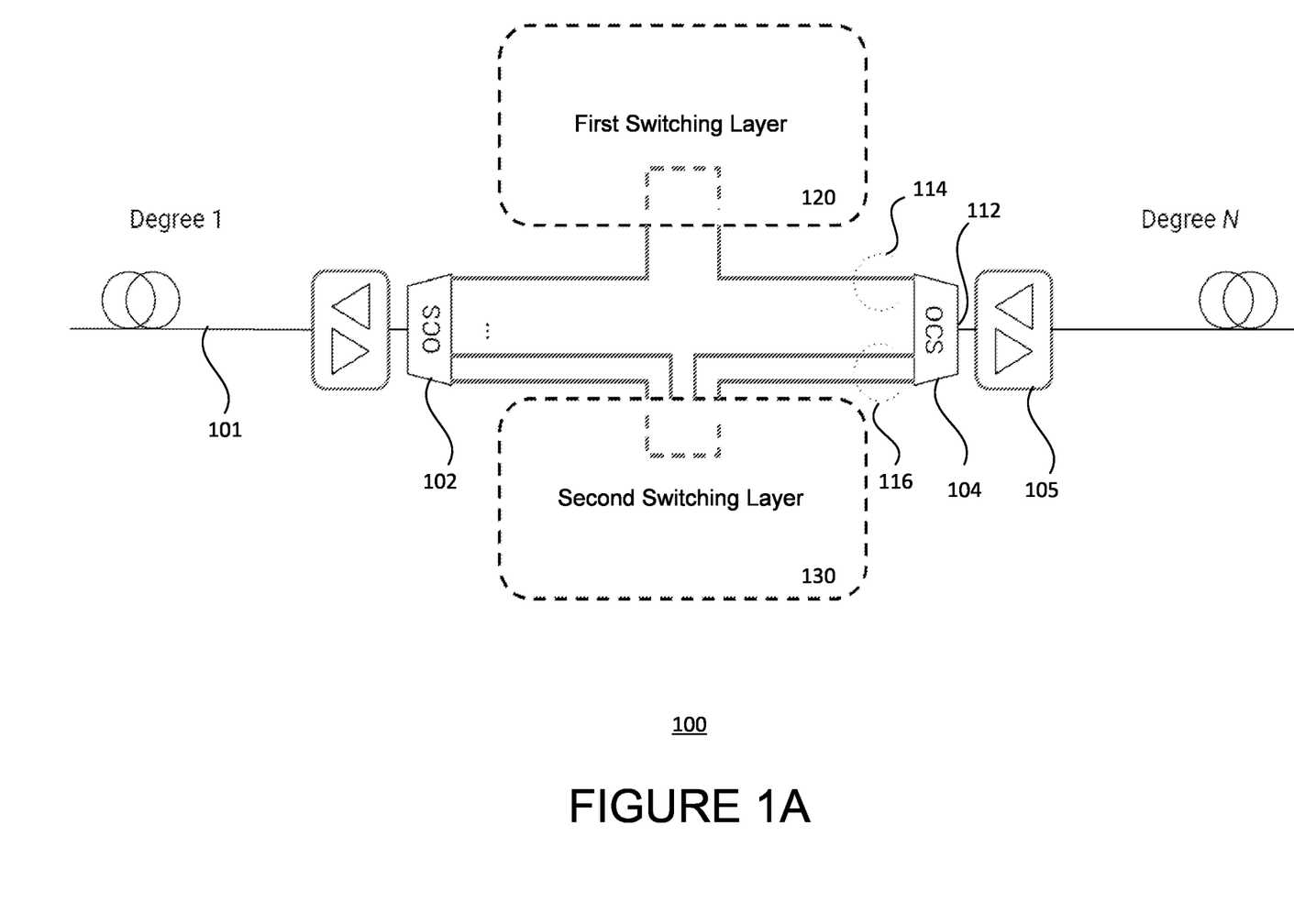
FIGS. 1A and 1B are schematic diagrams of a switching node in an optical transport network according to aspects of the disclosure.

FIG. 1A is a schematic diagram of a switching node 100 within an optical transport network (OTN). The switching node 100 is an N-degree node, whereby N is a positive integer greater than two. Optical signals may be received at the node 100 from one of the degrees and routed to one or more of the other degrees through the switching network of the switching node 100. Each degree includes an optical circuit switch (OCS) for connecting the switching node 100 to a respective optical transport fiber pair 101 of the OTN and outside of the switching node 100. In the example of FIG. 1A, a first degree (Degree 1) is shown as being connected to an optical transport fiber pair 101 by a first OCS 102, and a second degree (Degree N) is shown as being connected to another optical transport fiber pair by a second OCS 104. The switching node 100 may include other degrees having their own respective OCSs, whereby the first OCS 102, second OCS 104 and the other OCSs may be interconnected with one another.

A bi-directional node line amplifier 105 may be included at each degree of the switching node 100. In some instances, the bi-directional node line amplifier 105 may include unidirectional components positioned in both directions. For instance, the bi-directional node line amplifier 105 may include a pair of erbium doped fiber amplifiers (EDFA). For each degree, the bi-directional node line amplifier 105 may be positioned between the respective optical transport fibers of the degree and the OCS of the degree. The bi-directional node line amplifier 105 may be configured to amplify both incoming optical signals entering the node 100 and outgoing optical signals exiting the switching node 100.

In some instances, each OCS may be a 1×N switch, whereby each degree of the switching node 100 may be connected to each other degree by its respective OCS. As such, the OCSs of the switching node 100 may form a non-blocking matrix switch. In other instances, each OCS may connect to some of the other OCSs of the switching node 100, whereby some of the N degrees of the switching node 100 may be indirectly connected to one another through OCSs of other degrees of the switching node 100.

Each OCS may include a single input port 112 for connection to the optical transport fiber pair of the respective degree, and a plurality of output ports to for to various switching layers of the switching node 100. In the example of FIG. 1A, one or more first output ports 114 connect the second OCS 104 to a first switching layer 120, and one or more second output ports 116 connect the second OCS 104 to a second switching layer 130.

The first and second switching layers may have different levels of granularity. For instance, in FIG. 1A, the first switching layer may be any one of a wavelength switched layer for selectively routing optical signals that belong to a selected wavelength or range of wavelengths, a band switched layer for selectively routing optical signals that belong to a selected band of wavelengths, or a fiber switched layer for selectively routing optical signals depending on the optical fiber from which the signals are received.

Figure 1B:
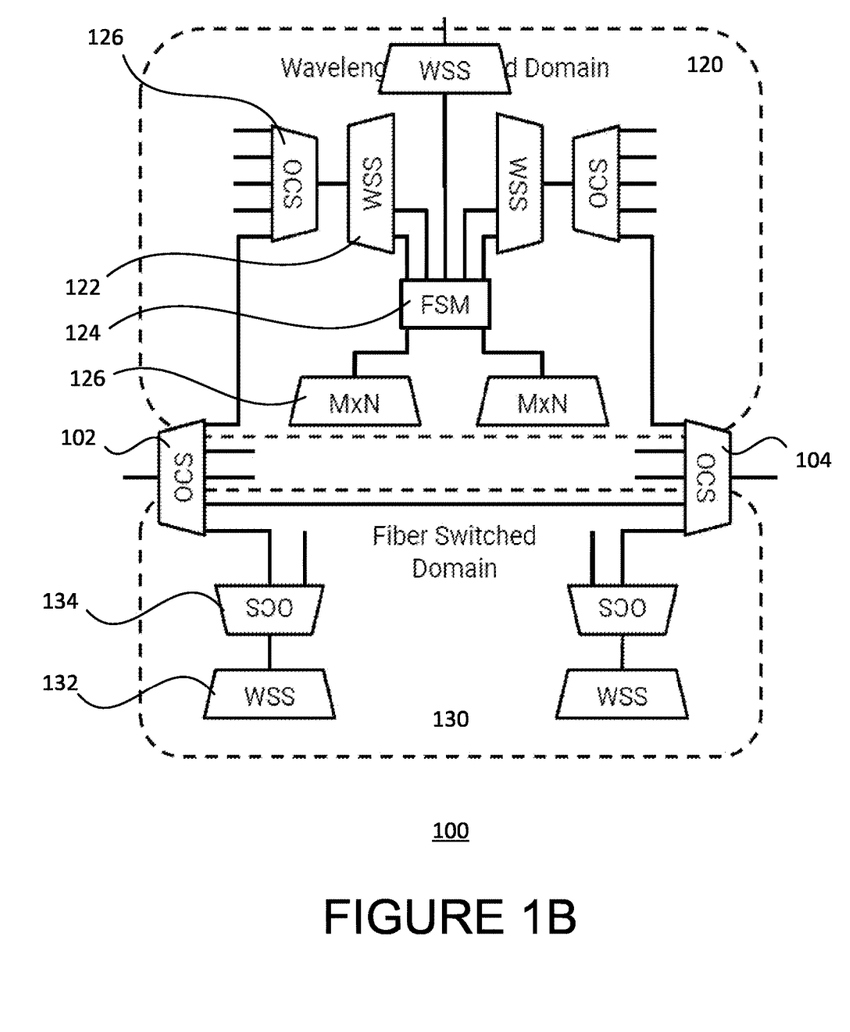

FIG. 1B is an example arrangement of the switching node 100 of FIG. 1A in which the first switched layer 120 is a wavelength switched domain or wavelength switched layer and the second switched layer 130 is a fiber switched domain or fiber switched layer. Each of the first and second switching layers 120, 130 are connected to the OCSs 102, 104 such that incoming optical signals can be routed from either OCS to either one of the first and second switching layers 120, 130 and outgoing optical signals can be routed from either one of the first and second switching layers 120, 130 to either OCS.

The wavelength switched layer 120 includes a wavelength selective switch (WSS) 122 through which the incoming optical signal is routed. The WSS 122 may control whether the optical signal is passed based on the wavelength of the optical signal. If the optical signal is passed, then a multi-node mesh, such as a fiber shuffle module (FSM) 124, connected to an add-drop architecture, such as a multi-cast switch (MCS), may be used to combine or separate optical signals of different wavelengths with or from one another. In a wavelength switched layer supporting a CDC architecture, the add-drop architecture may be contentionless, such as a contentionless M×N WSS 126, in which "M" is the number of degrees and "N" is the number of add/drop ports.

In effect, the wavelength switched layer 120 may operate as a CD or CDC node, and may further include OCSs 128 at outputs of the CD or CDC node in order to control the particular degree of the switching node 100 to which the combined or separated optical signals are routed. The OCSs of the switching node 100 may be wrapped around the CD or CDC node to ensure that an optical signal entering the node can be routed to any other degree of the node, thereby providing full switching programmability of the node.

The fiber switched layer 130 includes a switching architecture for controlling the routing of optical signals based on the optical fibers over which they are carried. The fiber switched layer 130 may include a WSS 132 to multiplex/demultiplex wavelength division multiplex (WDM) signals and may further include OCSs 134 at outputs of the fiber switched layer 130 to control the particular degree of the switching node 100 to which the combined or separated optical signals are routed.

Figure 2:
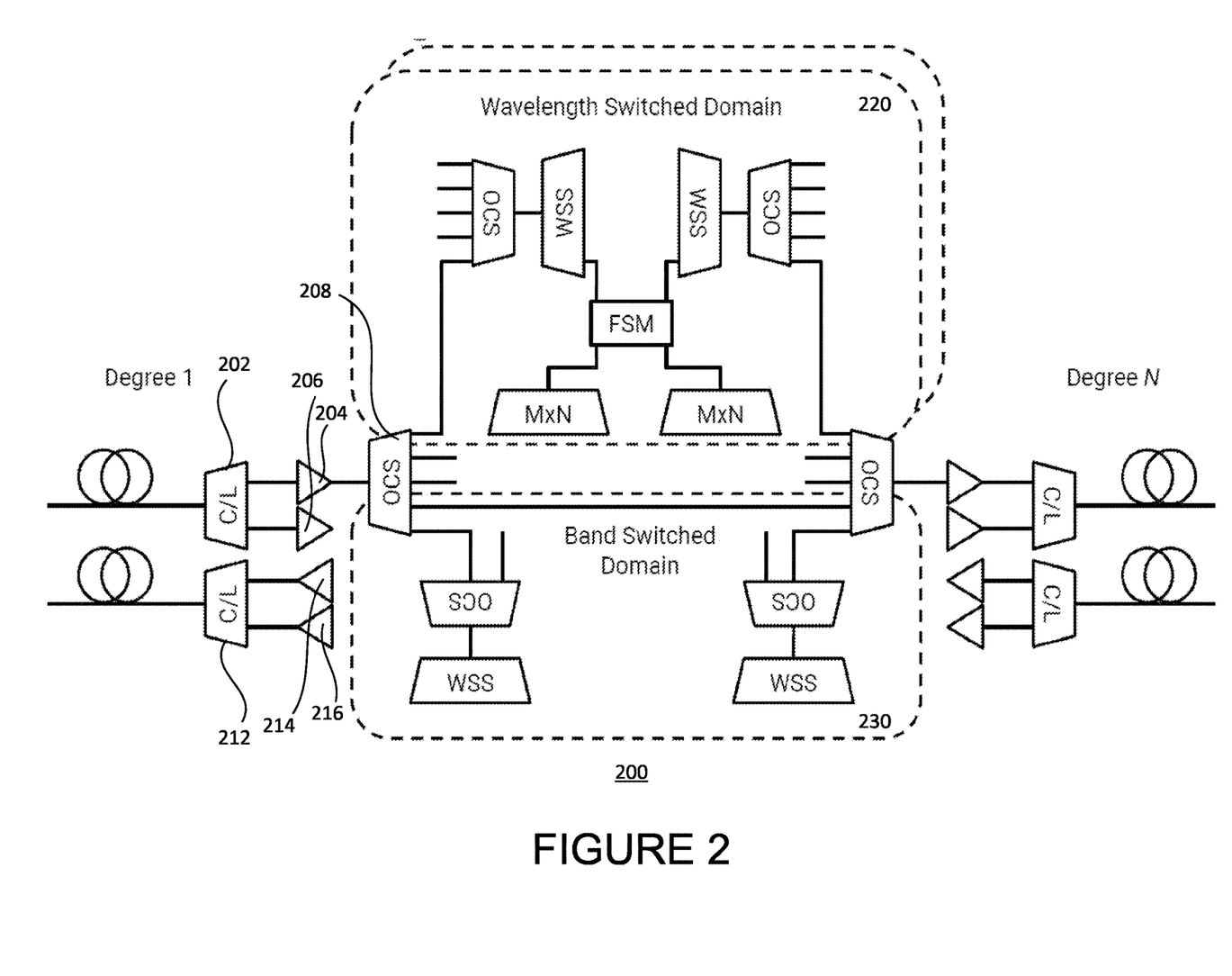
FIGS. 2-5 are schematic diagrams of other example configurations of a switching node according to aspects of the disclosure.

FIG. 2 illustrates another example arrangement of a switching node 200 having multiple switching layers with different levels of granularity. Particularly, in FIG. 2, the first switching layer is a wavelength switched layer 220 and the second switching layer is a band switched layer 230. In order to provide band switching in place of fiber switching, the bi-directional node line amplifier is arranged to include a band splitter 202 for splitting incoming optical signals between multiple bands, a respective ingress amplifier 204, 206 for each of the bands split by the band splitter 202, a band combiner 212 for combining outgoing optical signals belonging to different bands, and a respective egress amplifier 214, 216 for each of the bands being recombined at the band combiner 212. Additionally, each separate band divided by the band splitter 202 and rejoined by the band combiner 212 is connected to a separate OCS 208 of the switching node 200. For instance, in the example of FIG. 2, optical signals are split between the C band and the L band by the band splitter 202. In FIG. 2, a first OCS 208 connected to the first ingress amplifier 204 to receive the C-band optical signals amplified by the first ingress amplifier 204. Additionally, a second OCS (not shown) may be connected to the second ingress amplifier 206 to receive the L-band optical signals amplified by the second ingress amplifier 206. Likewise, separate OCSs may be connected to each of the egress amplifiers 214, 216 in order to route the outgoing optical signals to each of the degrees of the switching node 200. In the example of FIG. 2, in which each amplifier handles a single band, each amplifier may be an EDFA.

Although the wavelength switched layer of FIG. 2 illustrates only a single wavelength switched domain, it should be understood and appreciated that the switching node 200 may include multiple wavelength switched domains. The total number of degrees included in each wavelength switched domain can vary between switching nodes, and even between the various wavelength switched domains of a single switching node. Each wavelength switched domain may be connected to different OCSs of the switching node 200, whereby switching within the node may involve routing optical signals through multiple wavelength switched domains.

The examples of FIGS. 1B and 2 show nodes that include two switching layers having different granularities. However, the number of types of switching layers can be increased even further. For instance, three or more switching layers having different granularities may be provided.

Figure 3:
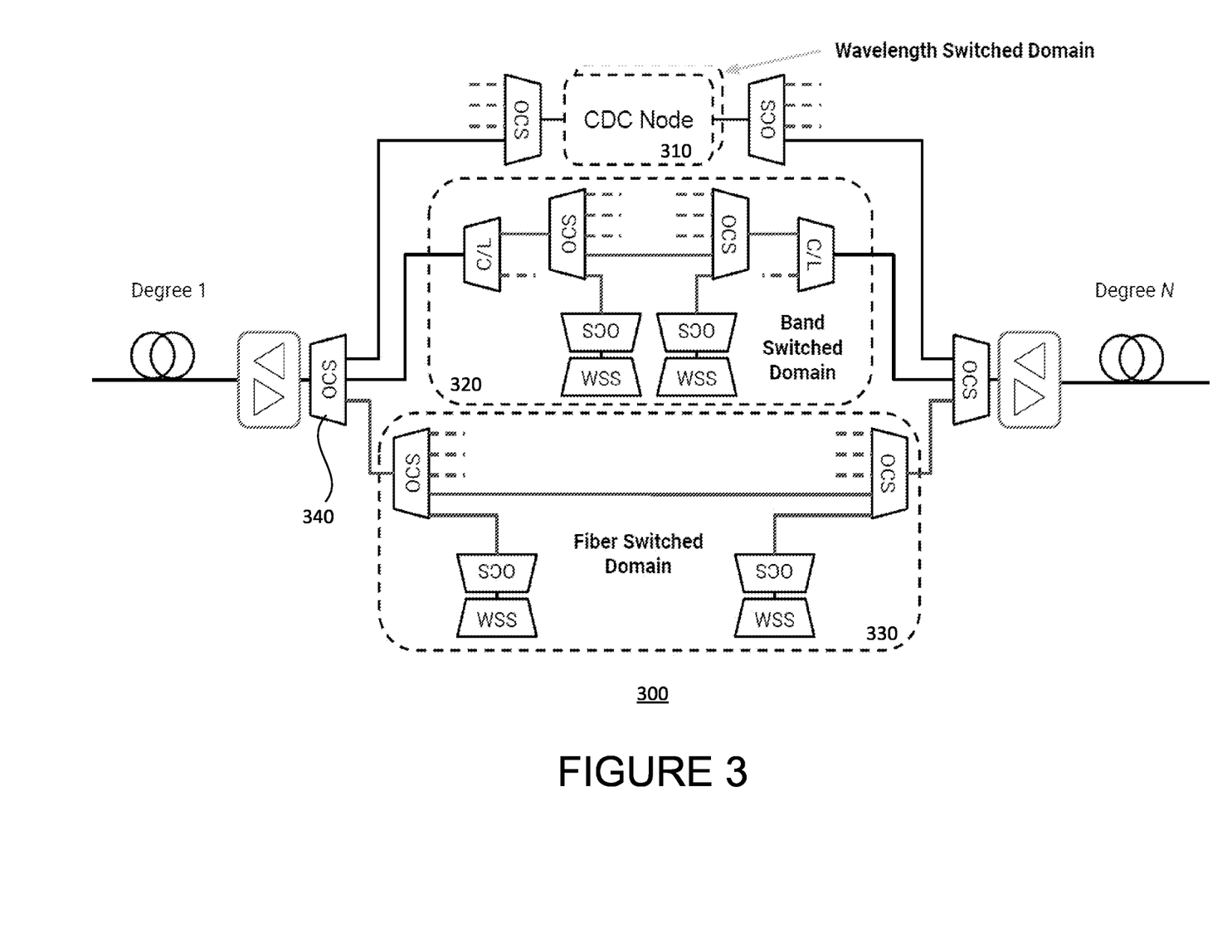

FIG. 3 illustrates an example parallel arrangement of a switching node 300 for arranging multiple types of switching layers in parallel to one another. In the example switching node 300 of FIG. 3, each of a wavelength switched layer 310, a band switched layer 320 and a fiber switched layer 330 are provided. At each degree of the switching node 300, an OCS 340 may be provided. The OCS 340 may include an input port connected to a respective optical transport fiber and multiple output ports, whereby each of the switching layers is connected to at least one of the output ports.

In operation, switching operations at the OCS 340 may be used to control to which of the switching layers 310, 320, 330 an incoming optical signal is sent. Additionally, each switching layer 310, 320, 330, may include its own respective OCS between the OCS 340 and the filtering and switching elements of the switching layer. The respective OCSs may be used for routing outgoing optical signals to any of the degrees of the switching node 300.

Figure 4:
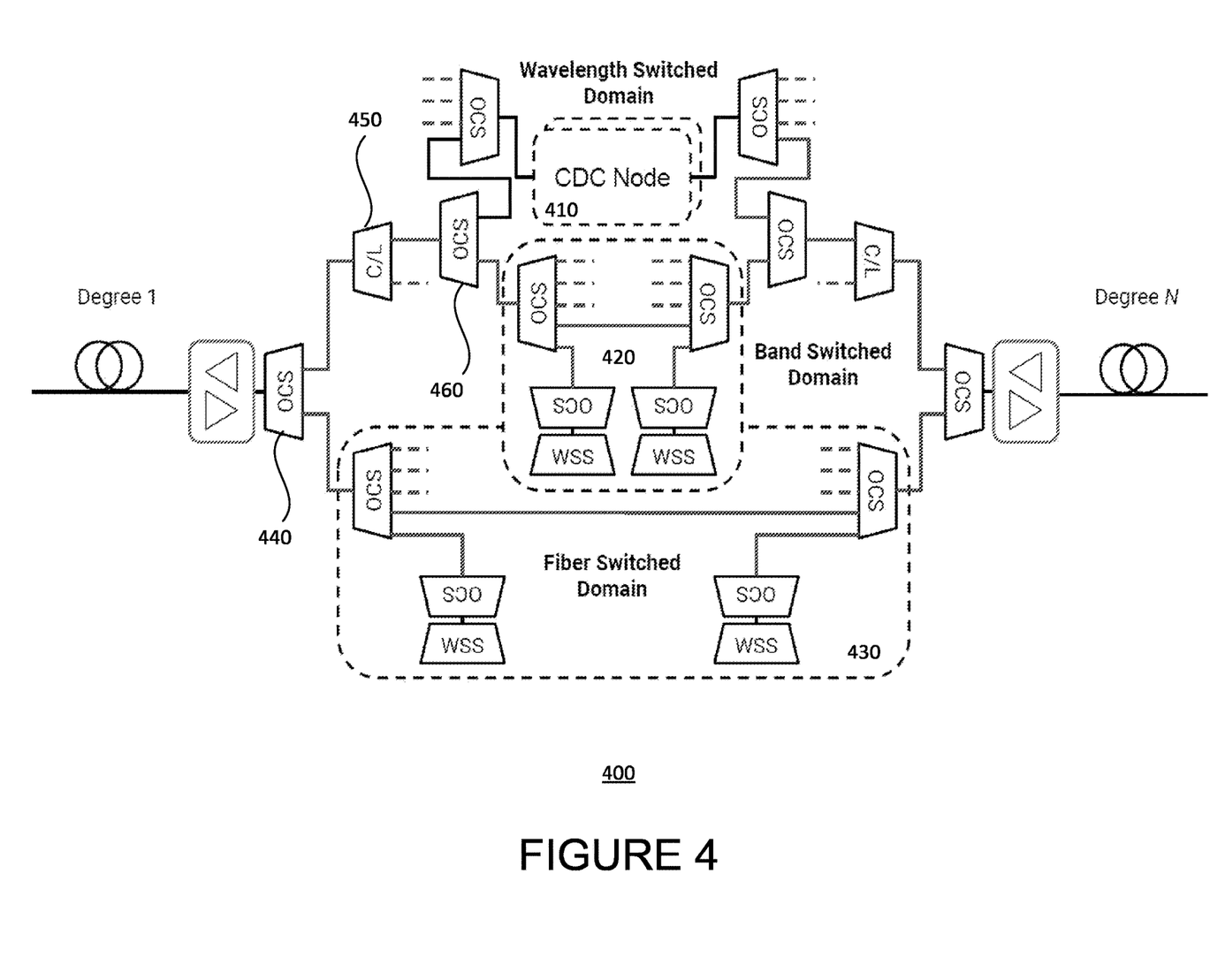

FIG. 4 illustrates an example cascaded arrangement of a switching node 400 for arranging multiple types of switching layers in a cascaded configuration. In the example switching node 400 of FIG. 4, each of a wavelength switched layer 410, a band switched layer 420 and a fiber switched layer 430 are provided. A respective first cascaded OCS 440 is provided at each degree of the switching node 400 to receive optical signals from the optical transport fibers at the degree, and to direct the incoming optical signals to either a switching layer of a coarsest granularity or to a next cascaded path. In the example of FIG. 4, the switching layer having the coarsest granularity is the fiber switched layer 430. The next cascaded path feeds the incoming optical signal to a next cascaded OCS 460 to direct the incoming optical signals to either a switching layer of a next-coarsest granularity or to a further cascaded path. In the example of FIG. 4, the switching layer having the next-coarsest granularity is the band switched layer 420. The further cascaded path feeds the incoming optical signal to the switching layer having the finest granularity, which in this case is the wavelength switched layer 410. Additionally, in the example of FIG. 4, a band splitter 450 is provided before the OCS 460 for the band switched layer 420. As with the band splitter of FIG. 2, the band splitter 450 may split the incoming optical signals between C-band and L-band, whereby a separate OCS 460 may be provided for each of the C-band and L-band.

In operation, switching operations at the first cascaded OCS 440 may be used to control whether incoming optical signals are sent to the coarsest-granularity switching layer or to a different switching layer, and the subsequent cascaded OCS 460 can similarly be used to control whether to push the incoming signal deeper into the cascaded arrangement or to the switching layer connected to that cascaded OCS.

Additionally, each respective switching layer 410, 420, 430, may include its own respective OCSs for routing outgoing optical signals to any of the degrees of the switching node 400.

Figure 5:
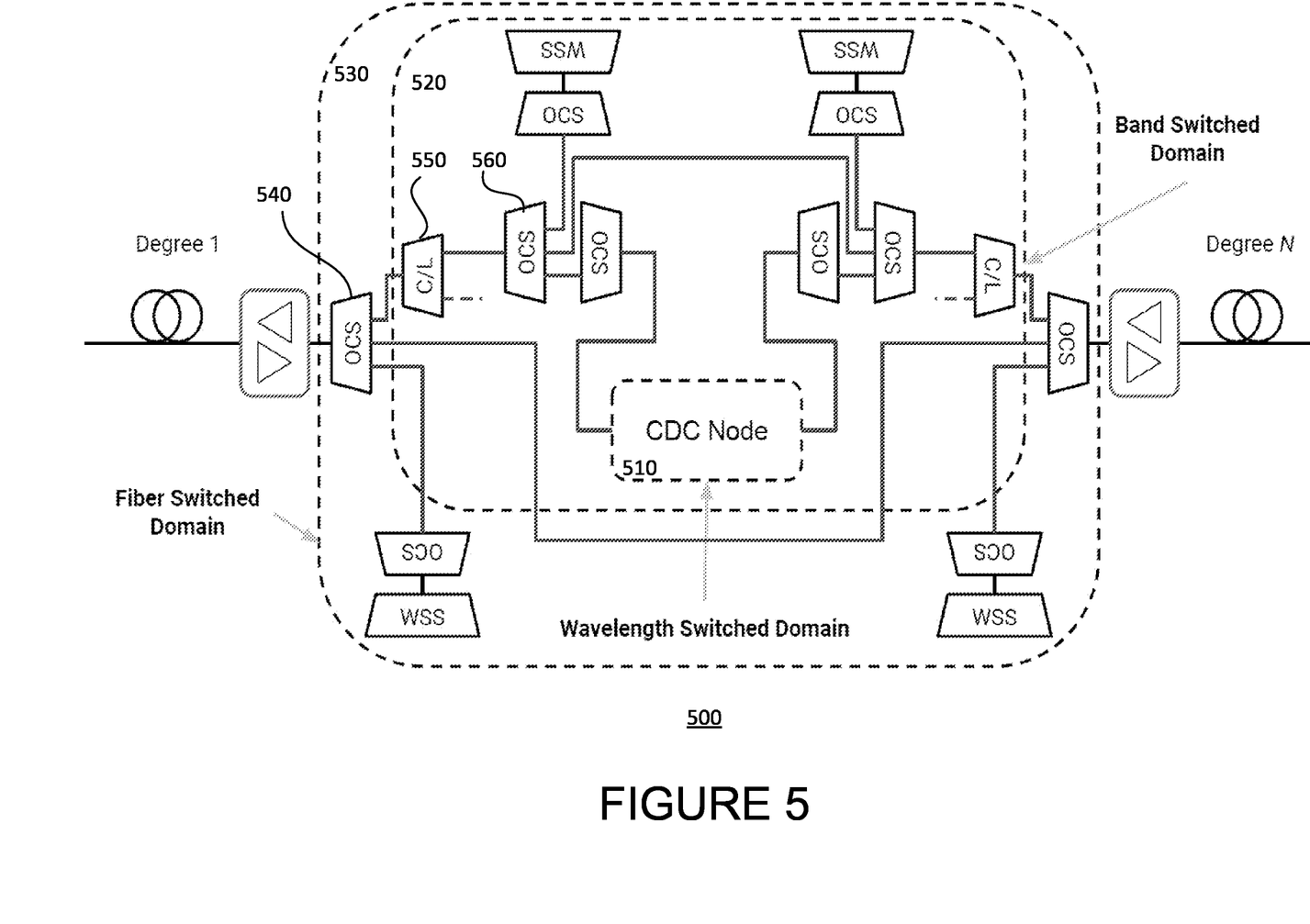

FIG. 5 illustrates an example nested arrangement of a switching node 500 for arranging multiple types of switching layers in a nested configuration. In the example switching node 500 of FIG. 5, each of a wavelength switched layer 510, a band switched layer 520 and a fiber switched layer 530 are provided. The arrangement of the nested configuration is similar to the cascaded configuration of FIG. 4. For instance, a respective first nested OCS 540 is provided at each degree of the switching node 500 to receive optical signals from the optical transport fibers at the degree and to direct the incoming optical signals to either a switching layer of a coarsest granularity or to a next nested level, and second nested OCS 560 is provided to receive optical signals from the first nested OCS 540 and to direct the received optical signals to either of the remaining switching layers 510, 520. Additionally, similar to the example of FIG. 4, a band splitter 550 is provided before the second nested OCS 560 for the band switched layer 520, and may split the incoming optical signals between C-band and L-band, whereby a separate OCS 560 may be provided for each of the C-band and L-band. Unlike the cascaded configuration of FIG. 4, each nested OCS 540, 560 may double as the OCS interconnecting the degrees of the switching node 500 within its respective switching layer.

The configurations shown in FIGS. 2-5 have directional symmetry, meaning that each switching layer is symmetrical and bi-directional. This allows optical signals to traverse each switching layer in either direction. Other configurations may be uni-directional or partially bi-directional, whereby at least some of the symmetrical elements are omitted. For instance, in the case of a wavelength switching layer, each degree of the switching node may be connected to the wavelength switching layer by either a WSS for receiving optical signals from the degree or an OCS for routing optical signals to the degree. Similar principles may be applied to the other types of switching layers.

While the above examples illustrated in the figures show three switching layers, it should be understood that the same or similar principles may be applied to further increase the total number of switching layers. For instance, in the parallel arrangement of FIG. 3, the OCS 340 may include an additional output port connecting to a further switching layer other than the three switching layers shown in the figure. For further instance, in the cascaded arrangement of FIG. 4, a further cascaded OCS may be added after OCS 460 in order to forward optical signals to a further switching layer other than the three switching layers shown in the figure. For further instance, in the nested arrangement of FIG. 5, a further OCS may be added before OCS 540 in order to split the optical signals between a further switching layer and the three switching layers shown in the figure. These principles may be further repeated as many times as needed in order to provide the desired number of levels of granularity.

The above example arrangements can be arranged in order to facilitate network architecture evolution over time. For instance, at an initial time of installation, the CD or CDC nodes of the wavelength switched layer of the switching node may be sufficient for routing the optical signals, but as traffic increases, it may become necessary to activate other switching layers of the switching node. In the above example arrangements, this may be facilitated at the OCS switches by initially routing incoming optical signals to the wavelength switched layer, and then as traffic increases, increasingly routing at least some optical signals to the other switching layers. Alternatively, if an added switching layer is a fiber switched layer, optical signals may be primarily routed through the fiber switched layer, and secondarily through the other layers, since the fiber switched layer incurs fewer costs and lower optical loss. The cookie cutter nature of the arrangements allows for the architecture of any given switching node to be tailed towards the particular current or future needs of the given node, whereby evolution of the node can be seamlessly facilitated.

Figure 6:
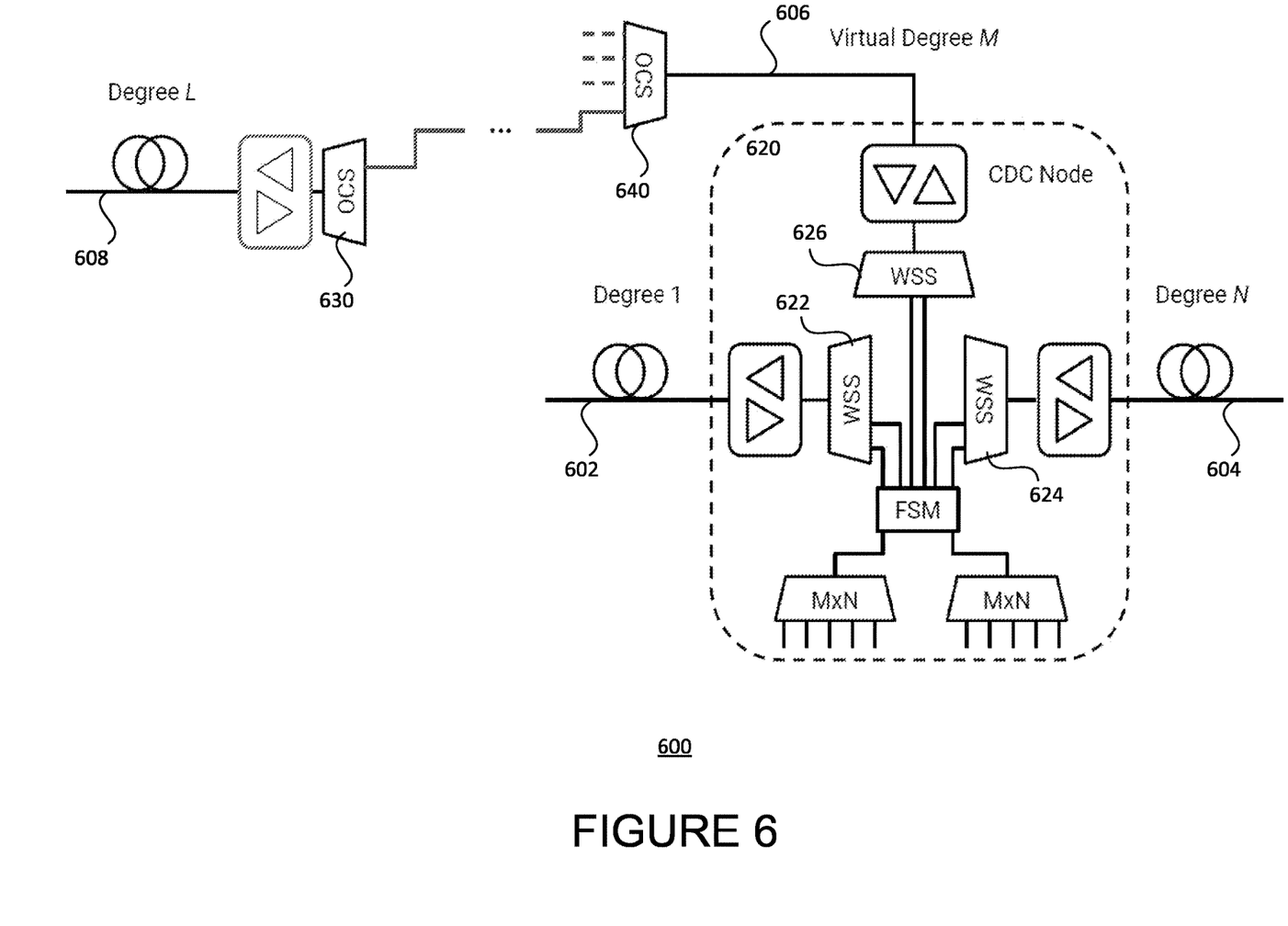
FIG. 6 is a schematic diagram of an example modified configuration of a CDC node according to aspects of the disclosure.

FIG. 6 illustrates another example configuration for network architecture evolution in a switching node 600, in which a CDC node 620 included in the switching node 600 may be evolved to connect to additional degrees. In the example of FIG. 6, CDC node is connected to N degrees. Each degree 602, 604 connects to a respective optical transport fiber pair of the OTN to a corresponding WSS, 622, 624 to facilitate optical signal routing and switching in the same or similar manner as shown in FIG. 1B. As with FIG. 1B, this may include adding and dropping of optical signals based on programming of the WSSs, an FSM, and a contentionless M×N WSS at the CDC node. An additional WSS 626 is shown. The additional WSS 626 is connected to a virtual degree 606, referred to as Degree M in the figure, which in turn may connect the CDC node 602 to another degree 608 of the switching node 600, referred to as Degree L in the figure. The virtual degree can control the connection between the CDC node 620 and the additional degree 608 using OCSs 630 and 640 positioned in between. One OCS 630 may control the transmission of outgoing optical signals from the CDC node 620 to the additional degree 608, and the other OCS may control the transmission of incoming optical signals from the additional degree 608 to the CDC node 620. In this manner, the OCSs 620, 630 can control when and under what conditions the additional degree 608 may be added to the switching architecture of the switching node 600.

The above examples do not specify a particular ratio between OCS-to-OCS connections and wavelength switched layers. It should be understood and appreciated that this ratio may vary from node to node depending on the particular needs and requirements of each node. Furthermore, the number of degrees in each wavelength switched domain may be far fewer than the total number of degrees in the switching node, but the wavelength switched domains may still be fully connected through additional switched domains, such as multiple wavelength switched domains positioned in parallel to one another. Further switching abilities may be realized through the OCSs connected thereto, the other switching layers connected thereto, or any combination thereof. As a consequence, it may be unnecessary to increase the number of degrees supported by each individual wavelength switched domain, meaning that the current state of 8-degree or 16-degree wavelength switched domains are sufficient for even future evolved arrangements of switching layer and switching node architectures.

The above examples also generally describe and illustrate OTN nodes supporting bi-directional communication at each of its degrees. However, it should be recognized that the underlying principles of the present disclosure may be similarly applicable to a node architecture including at least some degrees supporting uni-directional communication. In such cases, the degree may have one or more optical transport fibers instead of a transport fiber pair, and may include components for uni-directional amplification instead of bi-directional amplification. The example node may further be programmed to only route optical signals to the nodes having transmitting capabilities as opposed to the nodes having only receiving capabilities.

More generally, it should be recognized that the switching node of any of the above examples may have a total number of degrees greater than the number of degrees of any of the switched domains included therein. In effect, multiple parallel switched domains may be used in order to provide full connectivity and switching capability within the switching node.

Example Methods

Figure 7:
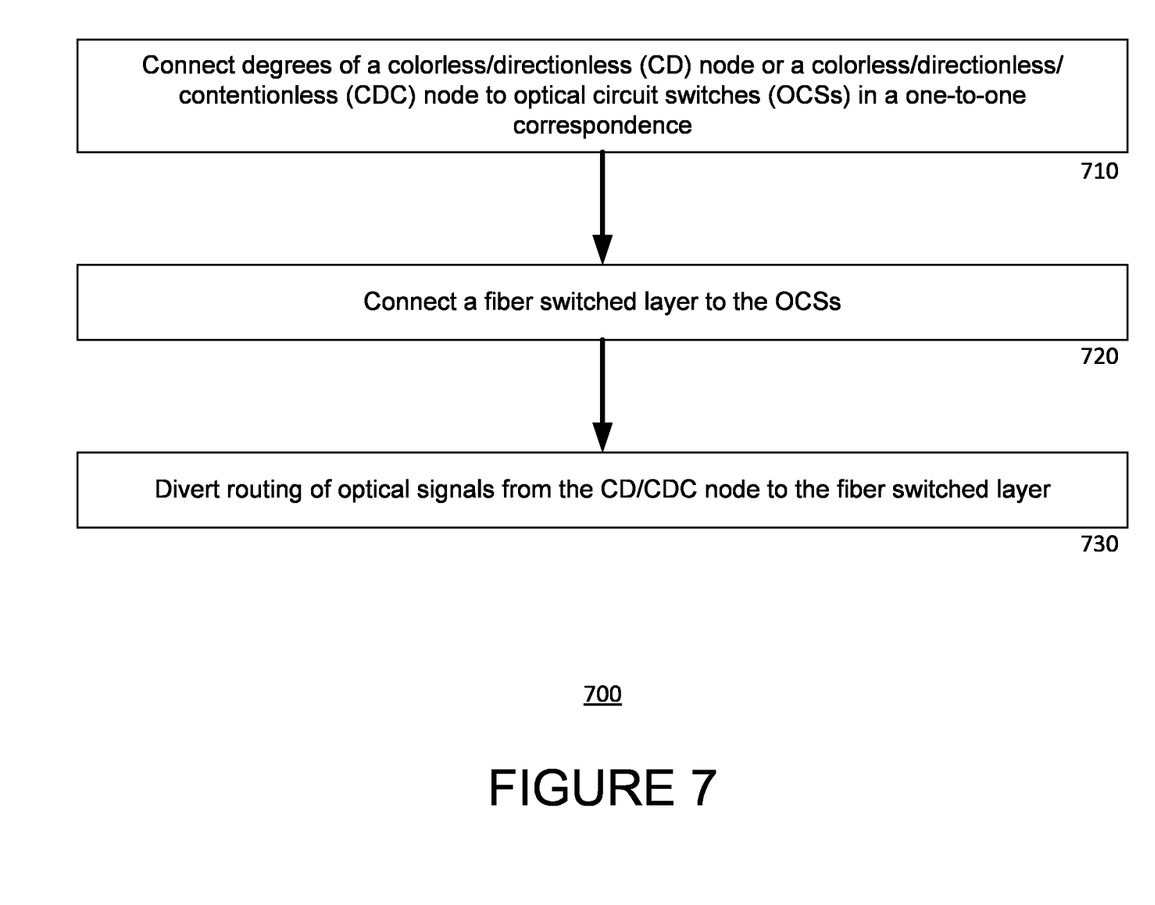
FIG. 7 is a flow diagram of an example routine according to aspects of the disclosure.

FIG. 7 is an example routine 700 for evolving an architecture of a switching node included in an OTN in accordance with the arrangements and configurations described herein. At an initial stage, the switching node may be limited to including only wavelength switching, and for instance may include a single CD or single CDC node.

At block 710, the degrees of the single CD or CDC node are connected to OCSs in a one-to-one correspondence. The OCSs may be wrapped around the CD or CD node in order to ensure that optical signals entering the node at one degree can leave the node at any other degree. Additionally, the OCSs provided may be connected to more than one CD or CDC node, such as by providing multiple CD or CDC nodes in parallel and interconnecting the CD or CDC nodes through OCS interconnections.

At block 720, the OCSs provided at block 710 may be further connected to a second switched layer having a level of granularity that is different from the CD or CDC. For instance, the OCSs may be connected to a fiber switched layer. The fiber switched layer may provide more cost efficient switching than the CD and CDC node, and may further achieve lower optical losses for optical signals traversing the fiber switched layer instead of the CD or CDC node. The OCSs may be arranged in order to control whether incoming optical signals are directed to the CD or CDC node, or whether they are directed to the fiber switched layer.

At block 730, the optical signals arriving at the switching node may be diverted from the CD or CD node and to the fiber switched layer instead by the OCSs. The presence of OCSs at each degree of the CD or CDC node allows for any optical signal arriving at the node to be diverted instead to the fiber switched layer. This arrangement allows for the switching node architecture to be adapted and evolved over time, such as to compensate for added capacity demands by utilizing the fiber connections that were added after initial deployment of the CD or CDC node.

The above-described method avoids the need to scale the CD or CDC node, or other wavelength-based switching solutions, as capacity demands increase, instead allowing those solutions to be incorporated into other solutions, such as newly added fiber switched domains. Over time, and as switching requirements and demands change, a predominantly wavelength switched architecture can be transitioned to a predominantly fiber switched architecture.

Furthermore, the presence of the OCSs at the degrees of the CD or CDC node, or more generally at each degree of the larger switching node including both the wavelength and fiber switched layers, allows for full programmability of the switching node, as well as for bi-directional switching solutions. Additionally, the use of additional OCSs to connect fiber switched domains in place of additional WSSs to create new wavelength switched domains is advantageous for a number of reasons, including the lower cost of OCS compared to WSS, the reduced optical losses of OCS compared to WSS, and the greater flexibility yielded by the fiber switched architecture compared to the wavelength switched architecture.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An optical transport network (OTN) node comprising:
   a first switching layer contained within the OTN node and having a first level of granularity;
   a second switching layer contained within the OTN node and having a second level of granularity different from the first level of granularity; and
   a plurality of optical circuit switches (OCSs), wherein each OCS is a respective degree of the OTN node, at least two OCSs comprising:
      an input port configured to be connected to a respective optical transport fiber outside of the OTN node;
      at least a first output port connected to the first switching layer; and
      at least a second output port connected to the second switching layer.

2. The OTN node of claim 1, wherein the first switching layer is one of a wavelength switched layer, a band switched layer or a fiber switched layer, and wherein the second switching layer is a different one of the wavelength switched layer, the band switched layer or the fiber switched layer.

3. The OTN node of claim 1, further comprising a plurality of bi-directional node line amplifiers coupled to the input ports of the plurality of OCSs in a one-to-one correspondence, each bi-directional node line amplifier positioned between a respective input port and its corresponding optical transport fiber.

4. The OTN node of claim 3, wherein each bi-directional node line amplifier includes:
   a band splitter configured to split an optical signal received from the respective optical transport fiber into different frequency bands;
   a plurality of ingress amplifiers, each ingress amplifier coupled to a respective output port of the band splitter;
   a band combiner configured to combine optical signals of the different frequency bands received from respective OCSs of the OTN node; and
   a plurality of egress amplifiers, each egress amplifier coupled to a respective input port of the band combiner.

5. The OTN node of claim 4, wherein the band splitter is a C+L band splitter and wherein the band combiner is a C+L band combiner.

6. The OTN of claim 5, wherein the first switching layer is a fiber switched layer, and wherein the second switching layer is a wavelength switched layer.

7. The OTN node of claim 1, wherein the OTN node further comprises a third switching layer having a third level of granularity different from the first and second levels of granularity, and wherein at least two OCSs further comprise at least a third output port connected to the third switching layer.

8. The OTN node of claim 1, wherein the first switching layer is a fiber switched layer, and wherein the second switching layer is a band switched layer, wherein the band switched layer includes a plurality of band splitters, and wherein respective output ports of the plurality of band splitters are connected to input ports of a second plurality of OCSs in a one-to-one correspondence, and wherein at least one output port of each OCS of the second plurality of OCSs is connected to a wavelength switched layer.

9. The OTN node of claim 8, wherein the fiber switched layer, the band switched layer, and the wavelength switched layer are arranged in parallel.

10. The OTN node of claim 8, wherein the fiber switched layer, the band switched layer, and the wavelength switched layer are arranged in either a nested formation or a cascaded formation.

11. The OTN node of claim 1, wherein each OCS includes:
   a respective input port configured to be connected to a respective optical transport fiber outside of the OTN node;
   at least one respective first output port connected to the first switching layer; and
   at least one respective second output port connected to the second switching layer.

12. A method comprising:
   connecting a plurality of degrees of a colorless/directionless (CD) node or a colorless/directionless/contentionless (CDC) node to a plurality of optical circuit switches (OCSs) in a one-to-one correspondence;
   connecting a fiber switched layer to the plurality of OCSs; and
   controlling the plurality of OCSs to divert routing of at least some received optical signals from the CDC node to the fiber switched layer.

13. An OTN node comprising:
   a first switching layer contained within the OTN node and having a first level of granularity;
   a second switching layer contained within the OTN node and having a second level of granularity different from the first level of granularity; and
   a plurality of OCSs, wherein each OCS is a respective degree of the OTN node, at least one OCS comprising:
      an input port configured to be connected to a respective optical transport fiber outside of the OTN node;
      at least a first output port connected to the first switching layer;
      at least a second output port connected to the second switching layer; and
      at least a third output port connected to a different one of the plurality of OCSs.

14. The OTN node of claim 13, wherein each of the first switching layer and the second switching layer is a respective wavelength switched layer including a plurality of wavelength selective switches (WSSs), and wherein the third output ports of the plurality of OCSs are connected to one another such that an optical signal transmitted between two of the third output ports does not pass through a WSS of the plurality of WSSs.

15. The OTN node of claim 14, further comprising: a plurality of band splitters, each band splitter being connected between a corresponding input port and its respective optical transport fiber, wherein the OTN node is configured to route an entire optical band from one degree of the OTN node to another degree of the OTN node without passing through the wavelength switched layer.

16. The OTN node of claim 13, wherein each of the first switching layer and the second switching layer is a respective wavelength switched layer, and wherein the OTN node has a total number of degrees greater than the number of degrees of the first switching layer and greater than the number of degrees of the second switching layer.

17. The OTN node of claim 13, wherein at least one of the switching layers is one of a wavelength switched layer, a band switched layer, or a fiber switched layer.

18. The OTN of claim 13, further comprising a third switching layer, wherein each of the first switching layer, the second switching layer and the third switching layer have different levels of granularity.

* * * * *